Patented Dec. 15, 1936

2,064,356

UNITED STATES PATENT OFFICE 2,064,356

CELLULOSIC MATERIALS AND METHODS FOR PRODUCING SAME

René Picard, Vaulx-en-Velin, and René Fays, Gauchy, France, assignors, by mesne assignments, to E. I. du Pont de Nemours & Company, Wilmington, Del., a corporation of Delaware No Drawing. Application July 17, 1935, Serial No. 31,890

10 Claims. (Cl. 18—54)

This invention relates to the manufacture of artificial cellulosic materials, such as artificial thread, filaments, films, or the like, and more particularly it relates to a method for the production of materials composed of regenerated cellulose which have an improved affinity for direct dyes.

Regenerated cellulose threads, filaments, films and the like, produced by the viscose process, have been dyed with direct dyes for a considerable period of time with more of less success. Nevertheless, it is often desirable to increase the affinity of such materials for direct dyes and many attempts have been made in the past to increase their affinity for these dyes.

It has previously been proposed to increase the affinity of regenerated cellulose materials, produced by the viscose process, for direct dyes, by applying certain substances to the finished product prior to the dyeing thereof. Such methods involved an appreciable added expense to the cost of the product, and in some cases either failed to increase their affinity for such dyes appreciably, or involved certain difficulties in controlling the depth of shades imparted thereto.

It has also been proposed heretofore, to add certain substances to the viscose solution to improve the dyeing characteristics thereof. These former proposals were objectionable for various reasons such as inefficiency of the substances added, imparting inferior physical characteristics to the product, et cetera.

It is therefore an object of this invention to produce regenerated cellulose threads, filaments, films and the like, by the viscose process, which materials have an improved affinity for direct dyes.

It is another object of this invention to provide a method of imparting an increased affinity for direct dyes to regenerated cellulose articles, produced by the viscose process, without materially increasing the cost of producing said articles and without producing any change in the physical characteristics of said articles.

Other objects of the invention will appear hereinafter.

The objects of this invention are accomplished, in general, by the preparation of a viscose solution having incorporated therein a quantity of an alkali metal hydrosulfite, and producing regenerated cellulose articles therefrom in a conventional manner.

The alkali metal hydrosulfite may be added to the viscose in any stage of the preparation thereof. For example, it may be added during the treatment of the cellulosic material with caustic alkali, during the xanthagenation of the cellulosic material or during any other stage of the preparation of the viscose. It is, however, preferred to add the hydrosulfite to the viscose after it is fully ripened and just prior to the use thereof in the spinning of artificial threads, or in the production of films or pellicles therefrom. The substance may also be added to the viscose adventageously in the pipe-line just prior to the extrusion thereof through a spinneret or hopper lip in the production of filaments or films. When the alkali metal hydrosulfite is added to the viscose during the preparation thereof or before the ripening thereof, there may be certain variations necessary in the time of ripening thereof. This variation in the ripening time will, of course, differ in accordance with the amount of hydrosulfite added. This variation in the period of ripening of the viscose can be easily ascertained by anyone skilled in the art by known tests.

The alkali metal hydrosulfite, for example, sodium hydrosulfite, may be added to the viscose in widely varying quantities whereby to obtain a distinct improvement in the affinity of the resulting regenerated cellulose articles for direct dyes. Based on the weight of the viscose solution, the sodium hydrosulfite may be present in quantities of 0.1%–7%, depending upon the increase in the affinity for direct dyes desired; however, it is usually preferable to add the hydrosulfite in quantities between 0.25%–5%, based on the weight of the viscose solution.

The quantity of sulfur contained in the final product after coagulation and/or regeneration thereof will be distinctly greater than that present in the absence of the addition of hydrosulfite. It will therefore be necessary to take every precaution to eliminate this additional quantity of sulfur from the cellulosic products. This will however entail no great difficulty but may be comparatively easily accomplished by increasing the strength of the desulfuring bath or increasing the period during which the desulfuring operation is carried out.

For the purpose of more clearly illustrating the present invention, reference is made to the following specific example, it being understood that the invention is in no way to be limited thereby:

Example

To a fully ripened viscose solution containing 8% cellulose, 7% sodium hydroxide and 2.4% sulfur is added 1.25% sodium hydrosulfite. After the addition of the sodium hydrosulfite, the mass is thoroughly agitated to form a homogeneous mixture. The viscose solution is then spun through a conventional rayon spinneret into a bath containing 120 grams sulfuric acid per liter, 250 grams sodium sulfate per liter, and 15 grams zinc sulfate per liter, to produce a thread having approximately 150 denier. The spinning is preferably accomplished by the so-called stretch-spinning process to increase the tenacity of the thread. The thread obtained is then spun into a centrifugal bucket and desulfured, bleached and washed in a conventional manner, the desulfuring operation, however, being carried out for a somewhat longer period than usual.

Threads, films, filaments and the like, obtained from a viscose solution containing a small quantity of sodium hydrosulfite, have been found to possess a distinctly greater affinity, and in some cases double the affinity for direct dyestuffs than products obtained from viscose which does not contain the hydrosulfite. The physical properties of artificial thread, films, filaments, or the like, are in no way inferior to those produced from viscose prepared without the use of a hydrosulfite.

The application of the present invention has particular utility in the production of viscose rayon by the so-called stretch-spinning process, in which, in order to obtain an increased tenacity, the thread is stretched during the spinning thereof. Thread which has been produced by the stretch-spinning process has been found to possess a smaller affinity for direct dyestuff than threads which have not been stretched during their spinning. The decrease in the affinity of threads produced by the stretch-spinning process can be compensated by the use of an alkali metal hydrosulfite.

It will be obvious that many variations and modifications can be made in the process as above disclosed, and it will therefore be understood that the invention is not to be limited thereto except as set forth in the appended claims.

We claim:

1. The method which comprises mixing an alkali metal hydrosulfite with a viscose solution, and forming a regenerated cellulose article from said viscose.

2. The method which comprises preparing a viscose solution containing an alkali metal hydrosulfite, and forming a regenerated cellulose article from said viscose.

3. The method which comprises preparing a viscose solution containing 0.25%-5% of an alkali metal hydrosulfite, and forming a regenerated cellulose article from said viscose.

4. The method which comprises preparing a viscose solution containing 0.25%-5% of sodium hydrosulfite, and forming a regenerated cellulose article from said viscose.

5. The method which comprises preparing a viscose solution containing 0.25%-5% of an alkali metal hydrosulfite, and stretch-spinning an artificial thread from said viscose.

6. The method which comprises preparing a viscose solution containing 0.25%-5% of sodium hydrosulfite, and stretch-spinning an artificial thread from said viscose.

7. A viscose solution containing as an essential ingredient thereof an alkali metal hydrosulfite.

8. A viscose solution containing as an essential ingredient thereof sodium hydrosulfite.

9. A viscose solution containing 0.25% to 5% alkali metal hydrosulfite.

10. A viscose solution containing 0.25% to 5% sodium hydrosulfite.

RENÉ PICARD.
RENÉ FAYS.